(12) United States Patent
Frusco

(10) Patent No.: US 9,138,009 B1
(45) Date of Patent: Sep. 22, 2015

(54) SHELLFISH OPENER

(71) Applicant: Louis J. Frusco, Toms River, NJ (US)

(72) Inventor: Louis J. Frusco, Toms River, NJ (US)

( * ) Notice: Subject to any disclaimer, the term of this patent is extended or adjusted under 35 U.S.C. 154(b) by 0 days.

(21) Appl. No.: 14/544,185

(22) Filed: Dec. 8, 2014

(51) Int. Cl.
*A22C 29/04* (2006.01)
*A47G 21/06* (2006.01)

(52) U.S. Cl.
CPC ............ *A22C 29/046* (2013.01); *A47G 21/065* (2013.01)

(58) Field of Classification Search
USPC ............... 452/1, 6, 8, 9, 12, 13, 17, 102–105; 7/125, 129–131, 132–135; 81/329, 81/338, 426, 337; 30/244, 250, 254
See application file for complete search history.

(56) References Cited

U.S. PATENT DOCUMENTS

| | | | | |
|---|---|---|---|---|
| 2,750,826 A * | 6/1956 | Lisbon | | 81/337 |
| 2,988,941 A * | 6/1961 | Ortman | | 81/344 |
| 4,312,127 A * | 1/1982 | Tanaka | | 30/92 |
| 4,787,279 A * | 11/1988 | Undin | | 81/313 |
| 6,116,124 A * | 9/2000 | Ping | | 81/385 |
| 6,832,532 B2 * | 12/2004 | Kilpela et al. | | 81/315 |

* cited by examiner

*Primary Examiner* — Richard Price, Jr.
(74) *Attorney, Agent, or Firm* — Clifford G. Frayne

(57) ABSTRACT

A shellfish opener in the form of a hand-held vise and blade, wherein the shellfish is positioned between an upper blade and a lower anvil jaw, the blade responsive to ratchet operation as a result of the squeezing of two handles, the blade severing the muscle and splitting the shellfish in half along its seam, to allow access to the meat of the shellfish.

11 Claims, 5 Drawing Sheets

SHELLFISH OPENER

RELATED APPLICATIONS

Applicant claims the benefit of provisional application Ser. No. 61/963,613, filed Dec. 11, 2013.

BACKGROUND OF THE INVENTION

1. Field of the Invention

The present invention relates to a vise-like hand-held ratcheting blade that can be used to easily open mollusks such as clams of the little neck, cherry stone, middle neck, or large neck varieties, oysters, and mussels.

2. Description of the Prior Art

Mollusks are shellfish which are found in seawater and reside on the sea bed, or in sandy areas subject to tidal affects. They are characterized as bi-valves as they obtain their nutrients from the sea water which is drawn into and ejected from the shell fish by means of a siphon membrane within the shellfish. Hard shell clams are generally referred to as quahogs, and can include little neck, cherry stone, middle neck, and large neck clams. Oysters and mussels also belong to the mollusk family as shellfish, but not of the quahog family.

Mollusks are harvested in a variety of ways, but the most common is by digging by hand in those tidal areas in which the claims may be found, or by mass harvesting methods from boats, such as dredging, or raking the sea bed. In order to consume the meat of the mollusk, the shell must be separated to obtain access to the meat. The shell consists of two complimentary hard shell concave halves forming the sides having a seam about the periphery of the joinder. The mollusk is categorized by an arcuate seam which is typically labeled the front of the mollusk, the seam terminating with a notch area which is referred to as the back of the mollusk. The notch area is essentially the hinge between the two complimentary concave halves of the shell and serves as the anchor for the interior muscle which maintains the closure of the seam of the mollusk allowing the siphon secured to one of the inner surfaces of the complimentary shells to draw in sea water through the seam for nutrients.

Mollusks can be opened under the influence of heat by steaming or grilling which results in the shells separating and the meat of the mollusk being cooked. Many people prefer their mollusks or shellfish raw, which requires the opening of the shell with a specialized tool commonly referred to as a clam knife. The clam knife is a knife having a handle portion and an approximately three inch tempered blade designed not to bend or break. The clam knife is aligned with the seam of the shellfish typically in the front, although it can be used in alignment with the back or notch of the shellfish. The clam knife is aligned with and touches the seam and a rocking motion is applied to the blade to separate the seam and to then continue with seam separation about the entire periphery of the two complimentary shells resulting in the separation of the shells at the notch or hinge, and access to the meat which then can be removed from the shell using the clam knife to shuck the meat, that is, cut the meat away from the shell and the siphon. In this manner, the raw meat of the shellfish can be prepared for consumption directly as raw meat, or with a condiment, such as melted butter or hot sauce, or the meat can be used for preparing other food dishes, such as chowders, fried clams or the like. It should be noted that while we have described the opening process of the shellfish with respect to clams, such an opening process is identical for the other shellfish mentioned such as oysters and mussels.

The use of the clam knife by an inexperienced person in opening a shellfish such as a clam as previously explained, can be hazardous in that a novice may frequently cut his hands, the knife may slip, and it takes some skill and experience to be able to align the knife edge with the seam of the shellfish and to effectuate the correct rocking motion with the correct amount of pressure in order to separate the two complimentary concave halves of the shellfish to gain access to the meat. Additionally, it is a time consuming job, even for the most experienced individual in opening shellfish.

There therefore has been a need for an easier and simple manner in which to open shellfish so that it can be accomplished in a quicker manner and more shellfish can be available to more individuals more easily and more quickly than the conventional method. Applicant's knife vise is an answer to that question and allows even the most inexperienced person to easily and quickly separate the complimentary concave halves of the clam shell for access to the meat of the shellfish.

OBJECTS OF THE INVENTION

An object of the present invention is to provide for a novel vise-like knife member for opening shellfish.

A still further object of the present invention is to provide for a novel vise-like knife member for opening shellfish wherein the vise member not only holds the shellfish, but operates under a ratcheting action to gradually and safely separate the seam and the halves of the shellfish.

A still further object of the present invention is to provide for a novel vise-like knife for opening shellfish, which is safely operated and does not present an open blade surface which could injure the user.

A still further object of the present invention is to provide for a novel vise-like knife member which can be sized to accommodate different size shellfish.

A still further object of the present invention is to provide for a novel vise-like shellfish opener which incorporates a secondary blade in a handle, which secondary blade can be utilized to separate the meat from the shell and siphon once the primary blade has opened the shellfish.

SUMMARY OF THE INVENTION

A shellfish opener in the form of a hand-held vise and blade, wherein the shellfish is positioned between an upper blade and a lower anvil jaw, the blade responsive to ratchet operation as a result of the squeezing of two handles, the blade severing the muscle and splitting the shellfish in half along its seam, to allow access to the meat of the shellfish.

BRIEF DESCRIPTION OF THE DRAWINGS

These and other objects of the present invention will become apparent, particularly when taken in light of the following illustrations wherein.

DETAILED DESCRIPTION OF THE INVENTION

Figure 1:
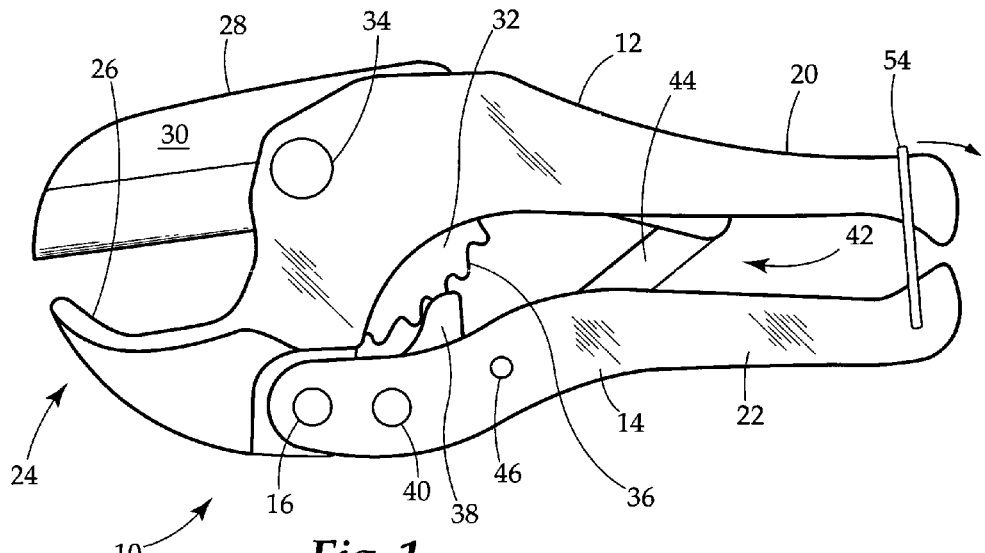
FIG. 1 is a planar side view of the shell fish opener of the present invention in a closed position.

FIG. 1 is a planar side view of the shellfish opener 10 of the present invention. Shellfish opener 10 is formed with two handle members, an upper handle member 12, and a lower handle member 14, handle members 12 and 14 are in articulating relationship about pivot point and pivot pin 16. Handle members 12 and 14 are designed to be gripped in the hand of the user at ends 20 and 22. The forward end 24 of upper handle member 12 forms an anvil 26 for securing and stabilizing a clam during the opening process and for storage of a blade member 28. Blade member 28 is L-shaped in configuration having a blade portion 30 and a depending ratchet member 32, blade member 28 is swivelly mounted to the upper handle member 12 at pivot point or pivot pin 34. The ratchet surface 36 of ratchet member 32 faces rearwardly from the anvil portion 26 of upper handle 12 and is cooperative with a ratchet lock 38 mounted on lower arm 14 at pivot pin 40. Additionally, there is an articulating two-piece ratchet arm 42 having a first ratchet arm member 44 pivotally secured to the lower handle 12 at pivot pin 46 and a second ratchet arm member 48 (See FIG. 2) mounted to the opposing terminal end of first ratchet arm member 44 and pivotally mounted to blade member 28 at pivot point 50.

Figure 6:
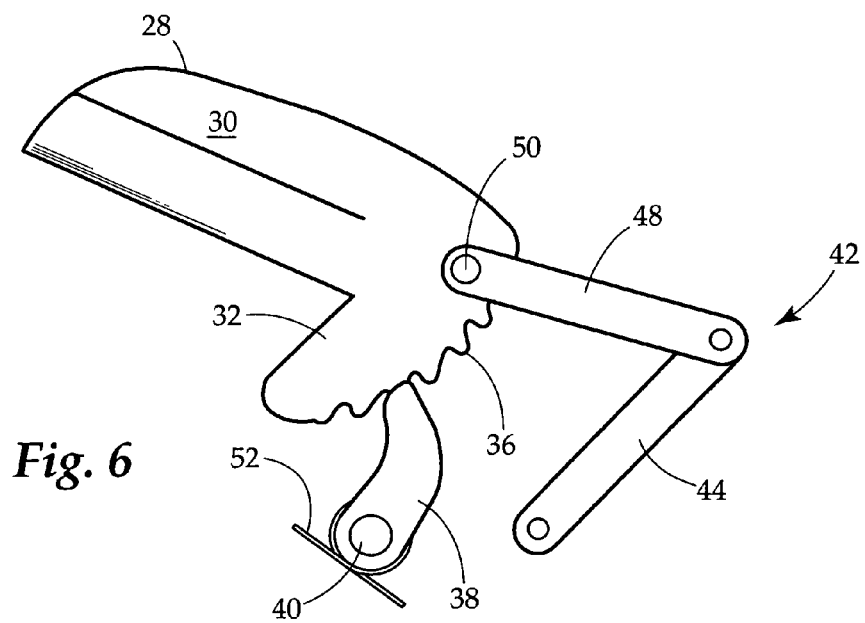
FIG. 6 is a planar side view of the ratchet mechanism of the shellfish opener of the present invention.

These articulating members associated with the movement of the blade member 28, are set forth in more detail in FIG. 6 which shows these members without the handle members 12 and 14 being present. It should be pointed out that the ratchet lock 38 is mounted to lower handle 14 at pivot point 40 and is biasly mounted about pivot point 40 with a spring member 52 as illustrated in FIG. 6 and not shown in FIG. 1. Additionally, a pivot locking latch 54 may be positioned at the ends of handle members 12 and 14 to secure blade member 28 in a secure closed position.

Figure 2:
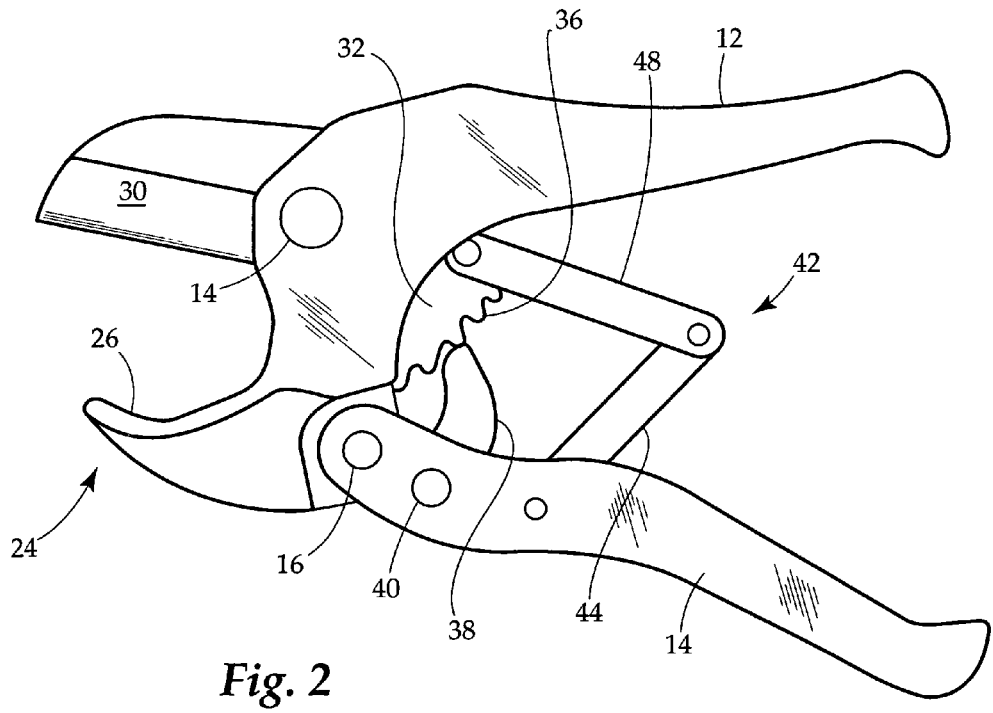
FIG. 2 is a planar side view of the shellfish opener of the present invention in an open positioned.

FIG. 2 is a planar side view of shellfish opener 10 in the open position. The open position is achieved by rotating lower handle member 12 downwardly about pivot point 16, as illustrated by arrow A in FIG. 2. This causes the ratchet arms 44 and 48 to articulate and rotate the blade member 28 and ratchet member from the closed position as illustrated in FIG. 1, to the open position as illustrated in FIG. 2. This position is maintained by the ratchet lock 28 engaging the ratchet surface 36 of the blade member 28. Lower member 12 is then rotated in the reverse position back to a substantially parallel position with upper handle 14. In this configuration, the shellfish opener 10 is primed or cocked to receive a shellfish.

Figure 3:
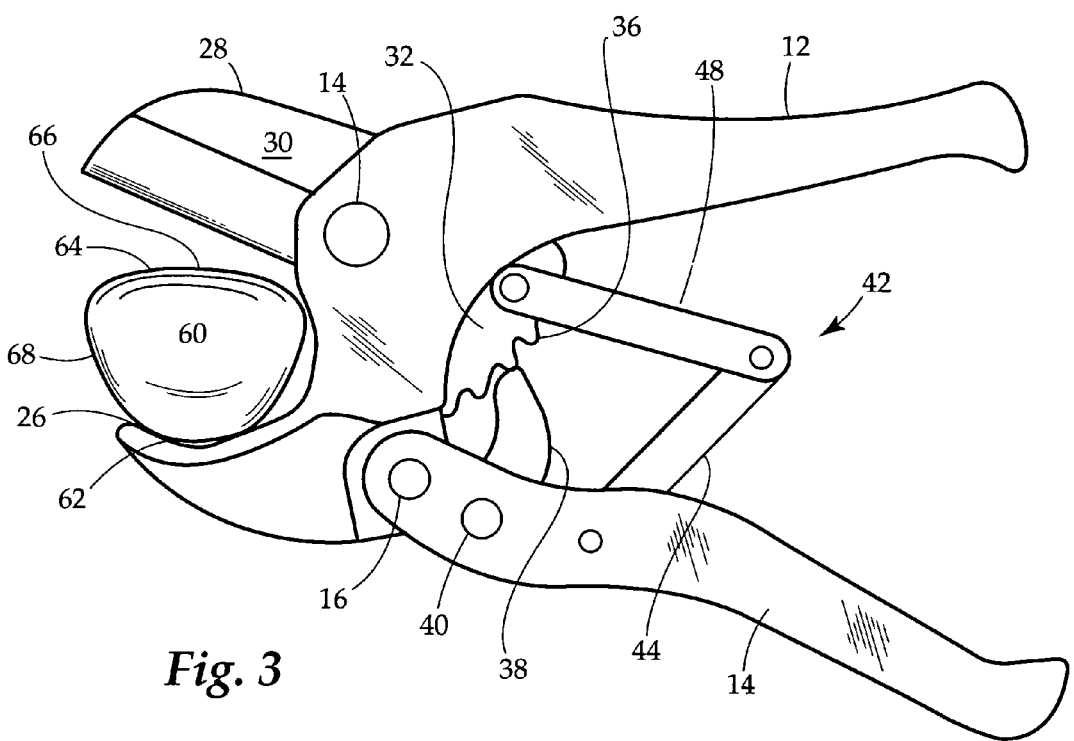
FIG. 3 is a planar side view of the shellfish opener of the present invention positioned to initiate the opening of a shellfish in the form of a clam.

FIG. 3 illustrates the shellfish opener 10 in the open position of FIG. 2 with a clam 60 having been positioned between the jaws defined by blade member 28 and anvil surface 26. Anvil surface 26 is slotted on its upper surface. The clam is positioned between the jaws with its front end 62 down and its back end 64 in an upward facing position with the notch 66 being proximate to the blade member 28, the blade member 28 and anvil 26 cooperate to position and stabilize the seam 68 about the periphery of the clam in alignment with the blade.

Figure 4:
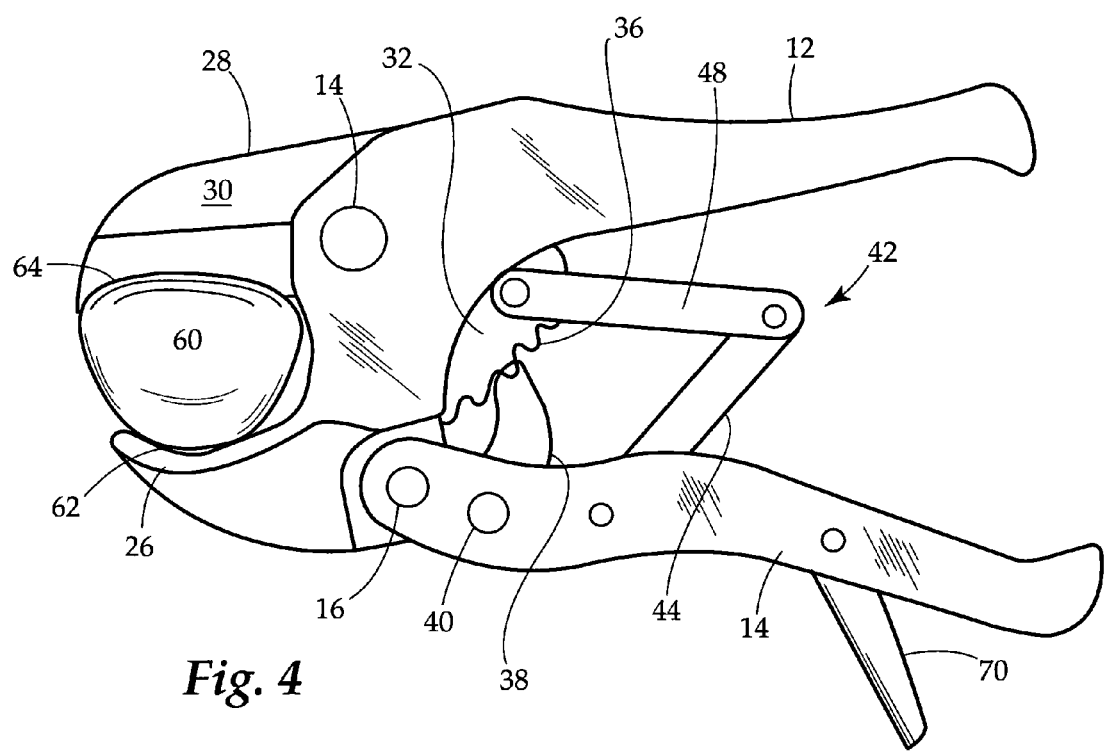
FIG. 4 is a planar side view of the shellfish opener of the present invention in the process of opening the clam.

FIG. 4 illustrates the ratcheting movement of the blade 30 against the shellfish, or clam, 60. The squeezing of upper and lower handle members 12 and 14 activates the ratchet lock 40 and the articulation of ratchet arms 44 and 48, causing blade 30 to move from the full opened position as illustrated in FIG. 3, to a closed position through a series of movements activated by the squeezing of the handle members 12 and 14. This action severs the seam 68 of the clam at its back end 14 proximate the notch 66, and proceeds downwardly separating the two halves of the shell until the seam 68 has been completely severed. The user now has two clam halves, one containing the meat of the clam, which can easily and quickly be loosened and removed utilizing a shucking blade 70, rotatably positioned within lower handle 12 and pivotally moved so that the user can utilize it to cut the meat from the clam. The shucking blade 70 when not in use would be pivotally stored within the lower handle 12.

Figure 5:
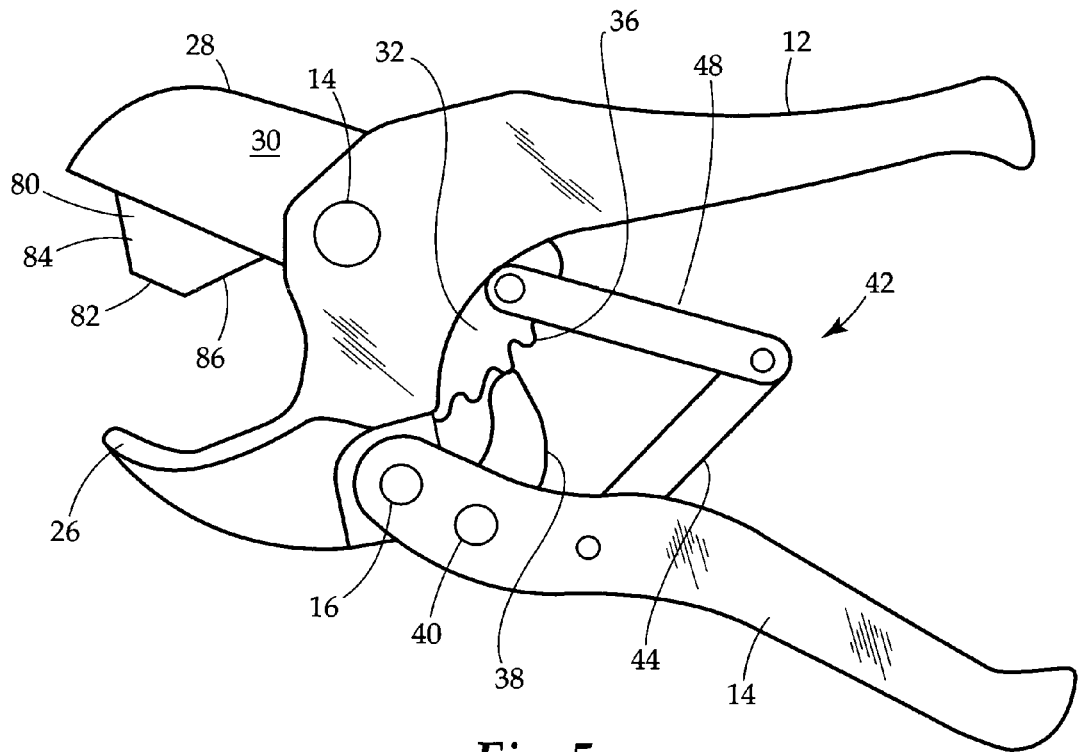
FIG. 5 is a planar side view of the shellfish opener of the present invention illustrating a second embodiment of the blade.

FIG. 5 represents a second embodiment of the shellfish opener 10. The entire apparatus is identical to that as previously described with the exception that the blade member 28 configuration has been modified. In FIG. 5, the blade configuration comprises a truncated wedge member 80, having a lower cutting surface 82, and upwardly divergent edges 84 and 86. The clam is positioned in the same manner as previously stated, however, the cutting edge 82 engages the notch 66 of the clam initially severing the seam and muscle, as the blade member 28 is ratcheted through the articulation of handle member 12 and handle member 14, the divergent edges 84 and 86 form a surface which as it moves downwardly, separates by prying apart the two shells forming the halves of the clam. This embodiment prevents the linear edge of the blade as illustrated in FIG. 1 from inadvertently possibly cutting the meat of the clam during the opening process. This second embodiment assures that there is a very small cutting surface 82 which initially penetrates the seam of the clam at the notch, and then the divergent wedge-like surfaces 84 and 86 serve to pry the two halves of the clam apart.

Figure 7:
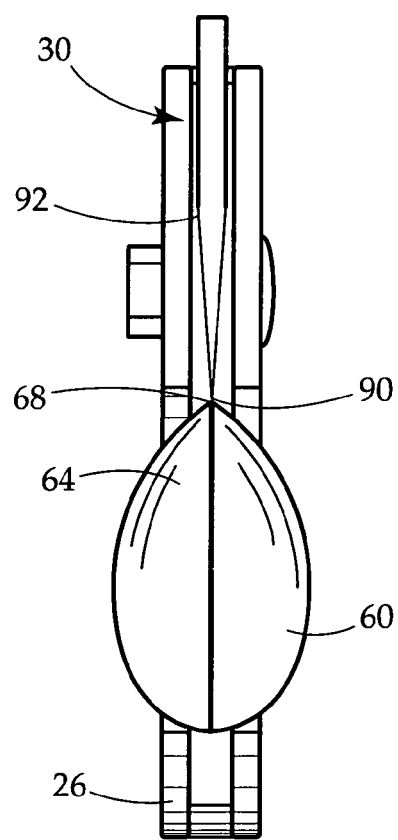
FIG. 7 is an end view of a clam stabilizer between the blade and anvil embodiment of FIGS. 1 through 4.
Figure 8:
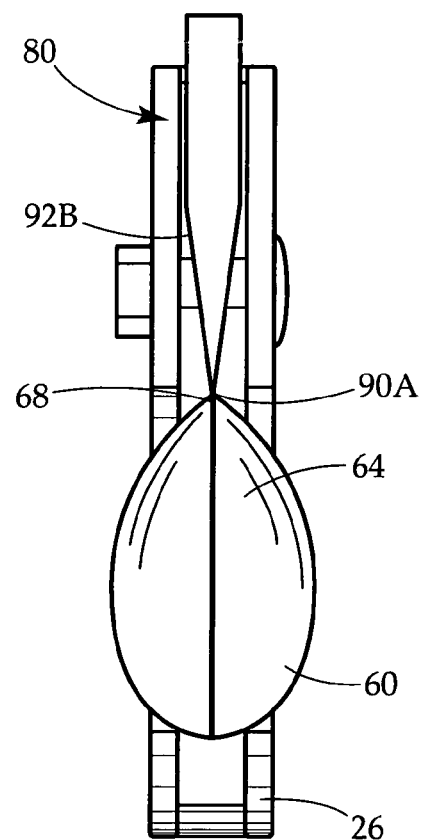
FIG. 8 is an end view of a clam stabilized between the blade and anvil of FIG. 5.

A better understanding of the profile of the blade portion of the blade member 28 of the present invention can be ascertained by reference to FIGS. 7 and 8 which are end views of a clam being stabilized between the blade portion and the anvil portion 30 and 26 respectively, of the embodiment illustrated in FIGS. 1 through 4 (FIG. 7) and the blade portion 80 and the anvil 26 in the embodiment illustrated in FIG. 5 (FIG. 8).

In FIG. 7, the edge 90 of the blade portion 30 is well defined and engages the clam 60 at its back end 64 at notch 66. The blade profile upwardly diverges 92 from the edge 90 in an effort to pressure or pry apart the two halves of the clam 60 along the seam.

FIG. 8 illustrates the profile of the blade of FIG. 5 which again, is formed with an edge 90A, but has a greater divergent profile 90B. The blade portion 80 is designed to again engage the clam 60 along the seam 68 of the clam 60 from its back end 64, proximate the notch 66. The front end of the clam 60 in both views rests and is stabilized in the anvil portion 26. The divergency of the blade portion 80 allows the user to pry open the halves of the clam 60 without more quickly shattering the shell.

For the casual user, the ratcheting action of handles 12 and 14 will cause the blade portion 30 or 80 to engage the notch 66 to simultaneously cut along the seam and pry apart the two halves of the clam 60 in order to gain access to the meat of the clam. The casual user would not be concerned with prying apart the two halves of the clam in a completely symmetrical manner with no broken shells. However, those users preparing clams or other shellfish for a raw bar featuring clams and other shellfish are concerned with the aesthetic appearance of the shell and the meat of the shellfish. In those instances, the user may choose to engage the blade portion, either 30 or 80 of the two embodiments with the notch 68 of the clam 60 in order to initially sever the notch and partially sever and pry open the seam of the clam. Such a user would then remove the clam from the device and continue prying the shells apart by hand, or utilize the shucking knife 70 positioned in handle 14 to sever the remaining seam of the clam. In this manner, the ratcheting pressure of the device would allow the user to initially sever and commence the prying apart of the two halves, the completion being accomplished by hand or with a shucking knife so as to insure the integrity of the shells for presentation in a raw bar or on a platter.

While the present invention has been described with respect to the exemplary embodiments thereof, it will be recognized by those of ordinary skill in the art that many modifications or changes can be achieved without departing from the spirit and scope of the invention. Therefore it is manifestly intended that the invention be limited only by the scope of the claims and the equivalence thereof.

I claim:

1. A shellfish opener for ease in opening shellfish and mollusks, the shellfish opener comprising:
   a first and second arm member secured in articulating relationship at a pivot point, a first end of said first arm member forming a first handle member, said second arm member forming a second handle member, said second end of said first arm bifurcated forming parallel spaced apart members terminating in an anvil member supporting a shellfish;
   a blade member having a downwardly facing cutting edge positioned on said first arm member, at a second pivot point between said bifurcated spaced apart members forming said second end, said blade member in alignment with said anvil member, said blade member having a depending arm unitary therewith and having a serrated ratchet surface formed on a rearward facing surface of said downwardly depending arm, said ratchet surface cooperative with a ratchet lock latch pivotally mounted on said second arm member;
   an articulating two piece ratchet arm having a first ratchet arm member pivotally secured to said second arm member at a third pivot point, and a second ratchet arm mounted to said first ratchet arm in pivotal relationship and secured to said depending arm of said blade member at a fourth pivot point;
   said blade member disposable downwardly toward said anvil member engaging the notch and seam of a shellfish, under successive repeated pressure on said first and second handle members resulting in a ratcheting action of said blade downwardly toward said anvil.

2. The shellfish opener in accordance with claim 1 wherein said anvil member being arcuate in shape and formed with a recess trough for positioning and stabilizing a front seam of said shellfish therein.

3. The shellfish opener in accordance with claim 2 wherein said blade is positioned in said anvil recess trough when not in use.

4. The shellfish opener in accordance with claim 3 wherein said shellfish opener is primed before separation of said blade and said anvil member by extending first handle member and second handle member in opposing directions positioning said blade member above and separated from said anvil member.

5. The shellfish opener in accordance with claim 2 wherein said recess trough of said anvil member positions and stabilizes said shellfish to provide alignment of said blade with a notch and a rear seam of said mollusk.

6. The shellfish opener in accordance with claim 2 wherein a safety lock is incorporated in said first handle member and said second handle member to lock said blade member in said recessed trough of said anvil member when not in use.

7. The shellfish opener in accordance with claim 1 wherein said ratchet lock latch is spring loaded in said second handle member.

8. The shellfish opener in accordance with claim 1 wherein said second handle member has a recess for positioning an articulating shuck knife blade for use in removing meat from the opened shellfish.

9. The shellfish opener in accordance with claim 1 wherein said blade is fixedly secured to said first arm member.

10. The shellfish opener in accordance with claim 9 wherein said blade member has an upwardly divergent profile from said downwardly facing cutting edge.

11. The shellfish opener in accordance with claim 1 wherein said blade is removably secured to said first arm member.

* * * * *